United States Patent
Chang et al.

(10) Patent No.: US 9,687,772 B2
(45) Date of Patent: Jun. 27, 2017

(54) INORGANIC-ORGANIC HYBRID NANOPOROUS MATERIAL WITH NITROGEN SELECTIVE ADSORPTIVITY AND METHOD FOR SEPARATING NITROGEN-CONTAINING GAS MIXTURE USING THE SAME

(71) Applicant: KOREA RESEARCH INSTITUTE OF CHEMICAL TECHNOLOGY, Daejeon (KR)

(72) Inventors: Jong-San Chang, Daejeon (KR); Young Kyu Hwang, Daejeon (KR); Ji Woong Yoon, Daejeon (KR); Do-Young Hong, Gyeonggi-do (KR); U-Hwang Lee, Daejeon (KR); Sukyung Lee, Daejeon (KR); Kyung Ho Cho, Gyeonggi-do (KR); Dong Won Hwang, Daejeon (KR); Youn-Sang Bae, Seoul (KR); Seung-Joon Lee, Seoul (KR)

(73) Assignee: Korea Research Institute of Chemical Technology, Daejeon (KR)

(*) Notice: Subject to any disclaimer, the term of this patent is extended or adjusted under 35 U.S.C. 154(b) by 0 days.

(21) Appl. No.: 14/866,345

(22) Filed: Sep. 25, 2015

(65) Prior Publication Data

US 2016/0089637 A1    Mar. 31, 2016

(30) Foreign Application Priority Data

Sep. 25, 2014    (KR) .................... 10-2014-0128638

(51) Int. Cl.
*B01D 53/04*    (2006.01)
*B01J 20/22*    (2006.01)
(Continued)

(52) U.S. Cl.
CPC ......... *B01D 53/0462* (2013.01); *B01D 53/02* (2013.01); *B01D 53/047* (2013.01);
(Continued)

(58) Field of Classification Search
CPC .. B01D 53/0462; B01D 53/047; B01D 53/22; B01D 2053/224; B01D 2253/204;
(Continued)

(56) References Cited

U.S. PATENT DOCUMENTS 5,989,316 A    11/1999   Kuznicki et al. ............... 95/130
8,980,128 B2    3/2015   Chang et al. ................. 252/194
(Continued)

OTHER PUBLICATIONS

Kuznicki, et al., "A titanosilicate molecular sieve with adjustable pores for size-selective adsorption of molecules," Nature, 412: 720-724 (2001).
(Continued)

*Primary Examiner* — Frank Lawrence
(74) *Attorney, Agent, or Firm* — Norton Rose Fulbright US LLP (57) ABSTRACT

The present invention relates to a nitrogen adsorbent having nitrogen selective adsorptivity by including an organic-inorganic hybrid nanoporous material having a coordinatively unsaturated metal site with density of 0.2 mmol/g to 10 mmol/g in a skeleton, surface or pore; and use thereof, such as a device separating nitrogen from a gas mixture containing nitrogen and methane, a pressure swing adsorption separation device and a temperature swing adsorption separation device for separating nitrogen provided, a method for separating nitrogen and methane from a gas mixture containing nitrogen and methane, a device for separating nitrogen, oxygen or argon, a method for separating nitrogen, oxygen or argon from a gas mixture containing nitrogen, oxygen or argon, and a method for preparing nitrogen or (Continued)

high purity inert gas all separated from a gas mixture containing nitrogen and inert gas.

19 Claims, 5 Drawing Sheets

(51) Int. Cl.
  B01J 20/28 (2006.01)
  C01B 23/00 (2006.01)
  C01B 21/04 (2006.01)
  C01B 13/02 (2006.01)
  C10L 3/10 (2006.01)
  B01D 53/22 (2006.01)
  B01D 53/047 (2006.01)
  B01D 53/02 (2006.01)

(52) U.S. Cl.
  CPC ........... *B01D 53/22* (2013.01); *B01D 53/228* (2013.01); *B01J 20/223* (2013.01); *B01J 20/28033* (2013.01); *C01B 13/0262* (2013.01); *C01B 21/0455* (2013.01); *C01B 23/0057* (2013.01); *C10L 3/105* (2013.01); *B01D 2053/224* (2013.01); *B01D 2253/10* (2013.01); *B01D 2253/1122* (2013.01); *B01D 2253/20* (2013.01); *B01D 2253/204* (2013.01); *B01D 2253/308* (2013.01); *B01D 2256/245* (2013.01); *B01D 2257/102* (2013.01); *C01B 2210/007* (2013.01); *C01B 2210/0015* (2013.01); *C01B 2210/0046* (2013.01)

(58) Field of Classification Search
  CPC ......... B01D 2257/102; B01D 2256/245; B01J 20/223; B01J 20/28033; C01B 13/0262; C01B 21/0455; C01B 2210/0015; C01B 2210/0046; C01B 2210/007; C10L 3/105
  USPC ........ 95/43, 47, 96, 130, 900, 902; 96/4, 10, 96/121; 502/400, 401
  See application file for complete search history.

(56) References Cited

U.S. PATENT DOCUMENTS

| | | | | |
|---|---|---|---|---|
| 2010/0069234 A1* | 3/2010 | Willis | .................... | B01D 53/02 502/401 |
| 2012/0129684 A1* | 5/2012 | Vimont | .............. | B01D 53/8628 502/170 |
| 2013/0035527 A1* | 2/2013 | Chen | ..................... | B01J 20/226 585/3 |
| 2013/0053585 A1* | 2/2013 | Long | ...................... | C07C 29/50 549/523 |
| 2014/0294709 A1* | 10/2014 | Long | ..................... | B01D 53/62 423/228 |
| 2015/0105250 A1* | 4/2015 | Weston | .................. | B01J 20/226 502/401 |
| 2015/0158012 A1* | 6/2015 | Ramanathan | .......... | B01J 20/226 95/96 |

OTHER PUBLICATIONS

Bloch, et al., "Selective Binding of $O_2$ over $N_2$ in a Redox-Active Metal-Organic Framework with Open Iron (II) Coordination Sites," J. Am. Chem. Soc., 133:14814-14822 (2011).

Hamon, et al., "Separation of $CO_2$—$CH_4$ mixtures in the mesoporous MIL-100(Cr) MOF: experimental and modelling approaches," Dalton Trans., 41: 4052-4059 (2012).

Lee, et al., "Design of a Metal-Organic Framework with Enhanced Back Bonding for Separation of $N_2$ and $CH_4$," J. Am. Chem. Soc., 136:698-704 (2014).

Dybtsev, et al., "Microporous Manganese Formate: A Simple Metal-Organic Porous Material with High Framework Stability and Highly Selective Gas Sorption Properties," J. Am. Chem. Soc., 126:32-33 (2004).

Mellot-DraznIels, et al., "Hybrid Organic-Inorganic Frameworks: Routes for Computational Design and Structure Prediction," Agnew. Chem. Int. Ed., 43:6290-6296 (2004).

Ferey, et al., "A Chromium Terephthalate-Based Solid with Unusually Large Pore Volumes and Surface Area," Science, 309:2040-2042 (2005).

Caskey, et al., "Dramatic Tuning of Carbon Dioxide Uptake via Metal Substitution in a Coordination Polymer with Cylindrical Pores," J. Am. Chem. Soc., 130:10870-10871 (2008).

Horcajada, et al., "Synthesis and catalytic properties of MIL-100(Fe), an iron(III) carboxylate with large pores," Chem. Commun., 2820-2822 (2007).

Serre, et al., "Very Large Breathing Effect in the First Nanoporous Chromium(III)-Based Solids: MIL-53 or $Cr^{III}(OH)\cdot\{O_2C$—$C_6H_4$—$CO_2\}\cdot\{HO_2C$—$C_6H_4$—$CO_2H\}_x\cdot H_2O_y$," J. Am. Chem. Soc., 124:13519-13526 (2002).

Lively, et al., "Hollow Fiber Adsorbents for $CO_2$ Removal from Flue Gas," Ind. Eng. Chem. Res., 48:7314-7324 (2009).

Kyuho Lee et al, J. Am. Chem. Soc., 136, P698-704 (2014).

T.E. Rufford et al, Journal of Petroleum Science and Engineering, 94-95, P123-154 (2012).

Putkham, Apipong, 'Synthesis, characterisation and gas absorption studies for metal organic framework materials', PhD Thesis Newcastle University (2010).

* cited by examiner

INORGANIC-ORGANIC HYBRID NANOPOROUS MATERIAL WITH NITROGEN SELECTIVE ADSORPTIVITY AND METHOD FOR SEPARATING NITROGEN-CONTAINING GAS MIXTURE USING THE SAME

This application claims the benefit of priority to Korean Patent Application No. 10-2014-0128638, filed Sep. 25, 2014, hereby incorporated by reference in its entirety.

FIELD OF THE INVENTION

The present invention relates to a core technology in a gas industry, which develops a nitrogen selective adsorbent including an organic-inorganic hybrid nanoporous material having a coordinatively unsaturated metal site, and through the development, the technology is capable of being used in selectively removing or separating nitrogen from a nitrogen-containing gas mixture such as natural gas, shale gas and air, and thereby purifying and concentrating each gas component, or compressing and liquefying the same.

BACKGROUND OF THE INVENTION

Separating and removing impurities, particularly nitrogen, included in natural gas is an important challenge for efficient utilization of methane, a main component of natural gas, as a fuel in fuel and chemical industries. With a recent shale gas boom, interests in separating nitrogen and methane have grown, and an energy value per unit volume of natural gas is reduced depending on the content of nitrogen included in liquefied natural gas, that is, natural gas in LNG preparation, and therefore, selectively removing nitrogen therefrom is an important matter affecting the value of natural gas. As one example, 25% of US natural gas contains rather high nitrogen content, and this becomes a limitation in directly using the natural gas as a raw material. With shale gas, a technology preparing high concentration methane by selectively separating and removing nitrogen included in a 5% to 20% range has recently been magnified. Specification of natural gas actually transferred to a pipeline is defined so that nitrogen content does not generally exceed 4% in order to satisfy calories, and accordingly, a process of removing nitrogen from natural gas prior to transfer is essential in order to follow the corresponding regulation.

Nitrogen included in natural gas is largely divided into two types, and one is nitrogen included in a natural gas field, and the other is a case of nitrogen introduced in large quantities for an enhanced oil recovery (EOR) process being mixed with natural gas. Nitrogen content included in a natural gas field is very different depending on a natural gas field, and varies from minimum 0.2% to maximum 25%. Among these, natural gas collected from a natural gas field containing 5% or more of nitrogen requires a nitrogen removing process called a nitrogen rejection unit (NRU), and collecting methane released together with nitrogen by the NRU process is an important issue. In the EOR process, 4% to 75% of nitrogen is included in collected hydrocarbon gas, typically methane, and removing nitrogen therefrom and collecting methane is also an important issue.

In order to separate large quantities of nitrogen, a cryogenic distillation method using a boiling point difference between nitrogen and methane has been widely used in the art. However, this method has a problem in that a boiling point difference between the two gases is only approximately 34° C. with the boiling point of nitrogen being −196° C. and the boiling point of methane being −162° C., and energy costs are excessively high since the gases need to be separated after being cooled to −162° C. or lower and distilled. Particularly, in the case of a small-scale gas field, using a process requiring excessive investment costs such as a cryogenic distillation method in order to remove nitrogen from natural gas is not economical. Accordingly, as an alternative separation method, a pressure swing adsorption (PSA) separation method, a temperature swing adsorption (TSA) separation method, a separation method using simulated moving bed (SMB) separation and a separation membrane, or a hybrid separation method combining PSA and membrane separation using a nitrogen selective adsorbent has been proposed. In order to complete such technologies, development of an adsorbent having high selectivity for nitrogen and excellent adsorptivity is the key. A PSA separation method is currently used to separate nitrogen and methane in a small-scale process, however, performances of existing commercial adsorbents are not outstanding enough to overcome the separation technology using a cryogenic distillation method, therefore, continuous development of technologies is required.

As the commercial adsorbent known to be effective in separating nitrogen and methane, a titanium silicate-series microporous Zeolite molecular sieves named ETS-4 is known. Several other adsorbents have been reported, but are insufficient in the performances to be used in a commercial separation process, and ETS-4 is considered as almost the only one adsorbent for separating nitrogen/methane. ETS-4 was developed by Engelhard Corporation (currently merged to BASF), a US catalyst company, and disclosed in the U.S. Pat. Nos. 4,835,202 and 4,928,929 in 1989 and 1990, and a technology separating nitrogen-containing methane using Ba-ion exchanged ETS-4 Zeolite was reported in the U.S. Pat. No. 5,989,316 in 1999. Furthermore, Sr-ion exchanged ETS-4 was used in separating nitrogen/methane, nitrogen/oxygen and argon/oxygen, and successful adsorption and separation was reported in 2001 (*Nature*, 412: 720-724 (2001)). The concept used herein is a "molecular gate" or "molecular sieve" effect, and by controlling pore sizes through changing a dehydration temperature of the Sr-ion exchanged ETS-4, it was used in adsorbing and separating nitrogen, methane, oxygen and argon having similar sizes in a range of 3 Å to 4 Å. The adsorbent exhibits a selective separation property for nitrogen so as to distinguish molecular sizes, however, there is a basic problem in that an adsorption amount for nitrogen is not high since adsorption rate differences induced from the molecular size differences are used in separation. In order to enhance separation efficiency represented by gas productivity selected in a PSA method, having high adsorption capacity for nitrogen and a high adsorption rate are preferable. However, according to the disclosure in the U.S. Pat. No. 5,989,316, adsorption capacity of Ba-ion exchanged ETS-4 Zeolite for nitrogen is approximately 9 ml/g at 1 atmosphere and 25° C., and it is seen that the Ba-ion exchanged ETS-4 Zeolite exhibits an advantageous property for nitrogen only in terms of an adsorption rate, and does not exhibit an excellent equilibrium adsorption amount. Accordingly, discovery of a nitrogen selective adsorbent having not only a high adsorption rate but also an excellent equilibrium adsorption amount has been required.

Meanwhile, air is a gas mixture including approximately 78% of nitrogen, 21% of oxygen and less than 1% of argon, carbon dioxide and the like, and is most common gas on earth. However, oxygen and nitrogen are widely used in the form of gas or liquid for industrial, research or medical purposes, and accordingly, studies on a method separating and concentrating these gases are required. In order to separate nitrogen or oxygen from the air with high purity, a method of cryogenic distillation using differences in boiling points of each gas has been used in the art. However, nitrogen has the boiling point of −196° C. and oxygen has the boiling point of −185° C., which is only a 11° C. difference in the boiling points of the two gases, and there is a disadvantage in that energy consumption is high since the gases need to be separated after being cooled to −185° C. or lower and distilled. In addition to the above-mentioned method, a method of using a commercial adsorbent having selective adsorptivity for nitrogen compared to oxygen such as Li-ion exchanged X-type Zeolite, so-called LSX Zeolite, a PSA method using differences in adsorptivity depending on a pressure, a separation method using a polymer separation membrane, or the like is used for air separation. However, these methods require a strict condition such that a special separation condition is required, and has high energy consumption, and therefore, are faced with the task of further enhancing energy efficiency.

An organic-inorganic hybrid nanoporous material, so-called a metal-organic framework, is also generally referred to as a "porous coordination polymers" or as a "porous organic-inorganic hybrid". The metal-organic framework has recently begun to be newly developed by grafting molecular coordinate bond and material science, and the metal-organic framework has been actively studied recently since it is not only applicable to an adsorbent, a gas storage material, a sensor, a membrane, a functional thin membrane, a drug-delivery material, a catalyst, a catalyst carrier and the like, but also is capable of being used in separating molecules depending on molecular sizes by collecting guest molecules smaller than pore sizes or using the pores, since the framework has a high surface area and molecular-sized or nano-sized pores. In addition, the metal-organic framework has an advantage of having nano-sized pores and thereby providing a high surface area, and therefore is mainly used in adsorbing materials or immersing compositions in the pores and transferring the composition.

Relating to this, types, preparation methods and the like of a metal-organic framework having selective adsorptivity for oxygen, moisture or harmful substances (J. Am. Chem. Soc., 133(37): 14814-14822 (2011); Korean Patent No. 10-0806586; Korean Patent No. 10-0803945; Korean Patent Application Laid-Open Publication No. 10-0982641) have been reported, and an air treatment device including the metal-organic framework as an adsorbent (Korean Patent No. 10-1106840호) has been reported. A French research group recently reported a research result that a metal-organic framework having an MIL-100 structure in which a chromium ion forms a skeleton has adsorption selectivity for carbon dioxide compared to methane, and therefore, PSA separation using the same may be accomplished (Dalton Trans., 41: 4052 (2012)). However, it was reported that the material used herein has a BET specific surface area of 1720 $m^2/g$ and a pore volume of 0.793 $cm^3/g$, and this is 90% or less of a specific surface area and a pore volume of a material capable of being obtained under an optimal condition, and porosity declines since a significant amount of impurities remain in the pores. The concentration of a coordinatively unsaturated metal site is not sufficiently high during dehydration as well, therefore, it may be expected that the concentration of an adsorption site capable of selectively adsorbing relatively inert gas such as nitrogen is difficult to be secured. In addition, a theoretical result that a metal-organic framework having an MOF-74 structure prepared from a divalent vanadium ion and a 2,5-dioxido-1,4-benzenedicarboxylate ligand may be used as a nitrogen selective adsorbent was proposed (J. Am. Chem. Soc., 136: 698-704 (2014)), however, this is only a result proposed by computer simulation, and an actual experimental result capable of verifying the corresponding result was not able to be provided. Accordingly, a metal-organic framework having nitrogen selective adsorptivity has not been experimentally verified so far.

SUMMARY OF THE INVENTION

Nitrogen gas, a most common element on earth and a main component of atmosphere, has relatively low activity and therefore, is generally known to have weak adsorption strength on a surface of a solid adsorbent. In this respect, separating nitrogen from a gas mixture in which nitrogen is mixed with other gases having weak adsorption strength for an adsorbent using an adsorption method is not simple. In order to solve such a problem, development of an adsorbent capable of selectively adsorbing nitrogen from a gas mixture by strong interaction with nitrogen is required. The present invention proposes an adsorbent including an organic-inorganic hybrid nanoporous material selectively adsorbing nitrogen gas suitable for such a purpose, a gas separation and concentration system and a gas liquefaction system using the same, and an application technology thereof.

In view of the above, the inventors of the present invention have studied and made an effort to find a method capable of separating and/or concentrating nitrogen and methane from natural gas by establishing a metal-organic framework having selective adsorptivity for nitrogen, and to find a method capable of separating and/or concentrating nitrogen, oxygen and argon in air by combining the nitrogen adsorbent with an oxygen selective adsorbent, and as a result, have found out that a metal-organic framework having a coordinatively unsaturated metal site, particularly, a metal-organic framework including at least one component among a trivalent chromium, cobalt, tungsten, molybdenum, iron, ruthenium, niobium, manganese, titanium or zirconium ion as a central metal is capable of being used as an adsorbent selective for nitrogen. Herein, the coordinatively unsaturated metal site is not limited to the skeleton of the metal-organic framework, and includes a case in which the metal-organic framework is used as a nitrogen selective adsorbent through forming a coordinatively unsaturated metal site by the corresponding metal components being collected or fixed in a skeleton pore or on the surface using a secondary method. Then the inventors of the present invention have identified that the adsorbent is utilized in highly concentrated concentration and liquefaction of gases such as nitrogen, methane and oxygen by being used in separating nitrogen/methane in natural gas, or used in separating nitrogen/oxygen in air, and have completed the present invention.

A first aspect of the present invention provides a nitrogen adsorbent including an organic-inorganic hybrid nanoporous material having a coordinatively unsaturated metal site in a skeleton, surface or pore, and thereby having nitrogen selective adsorptivity.

A second aspect of the present invention provides a device separating nitrogen from a gas mixture containing nitrogen and methane including the nitrogen adsorbent according to the first aspect of the present invention.

A third aspect of the present invention provides a pressure swing adsorption separation device for separating nitrogen provided with the nitrogen adsorbent according to the first aspect of the present invention.

A fourth aspect of the present invention provides a temperature swing adsorption separation device for separating nitrogen provided with the nitrogen adsorbent according to the first aspect of the present invention.

A fifth aspect of the present invention provides a method for separating nitrogen including removing nitrogen from a gas mixture containing nitrogen and methane using the nitrogen adsorbent according to the first aspect of the present invention.

A sixth aspect of the present invention provides a device for separating nitrogen, oxygen or argon provided with the nitrogen adsorbent according to the first aspect of the present invention and an oxygen adsorbent.

A seventh aspect of the present invention provides a method for separating nitrogen, oxygen or argon from a gas mixture containing nitrogen, oxygen or argon, the method including a first step of treating with the nitrogen adsorbent according to the first aspect of the present invention; and a second step of treating with an oxygen adsorbent, wherein the first step and the second step are carried out either in consecutive order or in reverse order.

An eighth aspect of the present invention provides a method for separating nitrogen from a gas mixture containing nitrogen and inert gas, the method including adsorbing the gas at an adsorption temperature of −20° C. to 80° C. using the nitrogen adsorbent according to the first aspect of the present invention.

A ninth aspect of the present invention provides a method for preparing high purity argon separated from an argon-containing gas mixture including oxygen, nitrogen and mixtures thereof, the method including adsorbing the gas on an organic-inorganic hybrid nanoporous material MIL-100 (Fe) adsorbent containing iron as a central metal; and collecting the permeated gas.

BRIEF DESCRIPTION OF THE DRAWINGS

An object and qualities of the present invention will become apparent from the following description of embodiments given in conjunction with the accompanying drawings, in which.

DETAILED DESCRIPTION OF THE EMBODIMENTS

Hereinafter, the present invention will be described in detail.

The present invention is based on a discovery that an organic-inorganic hybrid nanoporous material having a coordinatively unsaturated metal site (CUS), for example, a metal-organic framework of which metal coordination site is unsaturated by removing a ligand, typically water or a solvent molecule, coordinated to a metal present in a skeleton, surface or pore, or containing a coordinatively unsaturated metal site is capable of providing a nitrogen selective adsorbent having higher adsorptivity for nitrogen compared to methane, oxygen, argon or the like.

The coordinatively unsaturated metal site is not limited to the skeleton of the metal-organic framework, and includes a case generating a coordinatively unsaturated metal site by the corresponding metal components being collected or fixed in the pores or on the surface using a secondary method.

A metal-organic framework having oxygen adsorptivity with a purpose of gas separation has been reported, however, when gas is separated by adsorbing oxygen, high energy is normally needed to desorb the oxygen for collection since oxygen strongly binds to metal ions of a metal-organic framework. However, such a problem may be solved when using a nitrogen selective adsorbent.

The "organic-inorganic hybrid nanoporous material" is a porous organic-inorganic polymer compound having a 1-dimensional, 2-dimensional or 3-dimensional structure formed by a central metal ion coordinate bonding to an organic ligand, and includes both an organic material and an inorganic material in the skeleton structure, and means a crystalline compound having a molecular size or nanometer level pore structure. It is also called as a porous coordination polymer, and is also referred to as a hybrid nanoporous material, an organic-inorganic hybrid or a metal-organic framework (MOF). The metal-organic framework may include both an organic material and an inorganic material in the crystalline skeleton structure. For example, a polar metal ion and a carboxylate oxygen anion are both included in the crystalline skeleton, and a non-polar ligand aromatic compound group coexists therein, and therefore, hydrophilicity and hydrophobicity are exhibited at the same time.

Non-limiting examples of the organic-inorganic hybrid nanoporous material in the present invention may be represented by the following Chemical Formulae 1 to 5.

$M_3X(H_2O)_2O[C_6Z_{4-y}Z'_y(CO_2)_2]_3$ (M=Fe,Mn,Cr,V,Nb, Ta,Al,W or Mo; X=Cl,Br,I,F or OH; Z or Z'=H, $NH_2$,Br,I,$NO_2$ or OH; $0 \leq y \leq 4$);  [Chemical Formula 1]

$M_3O(H_2O)_2X[C_6Z_{3-y}Z'_y(CO_2)_2]_2$ (M=Fe,Mn,Cr,V,Nb, Ta,Al,W or Mo; X=Cl,Br,I,F or OH; Z or Z'=H, $NH_2$,Br,I,$NO_2$ or OH; $0 \leq y \leq 3$);  [Chemical Formula 2]

$M_3O(H_2O)_2X_{1-y}(OH)_y[C_6H_3(CO_2)_3]_2$ (M=Fe,Mn,Cr, V,Nb,Ta,Al,W or Mo; X=Cl,Br,I or F; $0 \leq y \leq 1$);  [Chemical Formula 3]

$M_3X_{1-y}(OH)_y(H_2O)_2O[C_6H_4(CO_2)_2]_3$ (M=Fe,Mn,Cr, V,Nb,Ta,Al,W or Mo; X=Cl,Br,I or F; $0 \leq y \leq 1$);  [Chemical Formula 4]

$M_aO_bX_cL_d$  [Chemical Formula 5]

(M is one or more metal ions selected from the group consisting of Ti, Zr, V, Cr, Nb, Ta, W, Mo, Fe, Co, Ni, Cu, Zn, Al, Mg, Ca and Li, O is oxygen, X is one or more anion ligands selected from the group consisting of $H^-$, $F^-$, $Cl^-$, $Br^-$, $NO_3^-$, $BF_4^-$, $PF_6^-$, $I^-$, $SO_4^{2-}$, $HCO_3^-$ and $R_nCOO^-$ ($R_n$ is a $C_1$-$C_6$ alkyl group), L is one or more organic ligands selected from the group consisting of a carboxylic group (—COOH), a carboxylate anion group (—COO—), an amine group (—$NH_2$) and an imino group (—NH), a nitro group (—$NO_2$), a hydroxyl group (—OH), a halogen group (—X) and a sulfonic acid group (—$SO_3H$), a is a numeral of 1 to 12, b is a numeral of 0 to 6, c is a numeral of 0 to 12 and d is a numeral of 1 to 12).

Non-limiting examples of the metal-organic framework are disclosed in U.S. Pat. No. 5,648,508, and the literature is integrated into the present specification. Specific examples thereof may include a hybrid nanoporous material named as MIL-100, MIL-101, MIL-102, MIL-110, MIL-125, MIL-125_$NH_2$, MIL-127, UiO-66, UiO-66_2COOH, (UiO-66-BTEC), UiO-66_COOH, UiO-66-BTC, UiO-66_$NH_2$ and the like.

In the present invention, the type of the metal-organic framework capable of being used is not limited as long as the framework has a coordinatively unsaturated metal site (CUS). The coordinatively unsaturated metal site may be formed in the skeleton, or may be formed in a metal ion or organic metal compound present on the surface or in the pores of the metal-organic framework. The coordinatively unsaturated metal site is a coordinatable site of a metal in which a ligand, typically water, an organic solvent or the like, coordinated to a metal ion of the metal-organic framework, is removed, and means a site in which another ligand is capable of forming a coordinate bond again. In order to secure a coordinatively unsaturated metal site of the metal-organic framework, pretreatment removing water or a solvent component bonding to the coordinatively unsaturated metal site may be preferably carried out. The pretreatment may use any method as long as water or a solvent component is removed without causing deformation of the metal-organic framework, and for example, may be accomplished by heating to a temperature of 100° C. or higher under reduced pressure, and preferably accomplished by heating to a temperature of 150° C. or higher, however, the method is not limited thereto. Alternatively, pretreatment may be carried out using methods such as vacuum treatment, solvent exchange and ultrasonic treatment, which are solvent removing methods known in the art without limit.

Preferably, the metal-organic framework may have a coordinatively unsaturated metal site with density of 0.2 mmol/g to 10 mmol/g. When the density of the coordinatively unsaturated metal site of the metal-organic framework is less than 0.2 mmol/g, nitrogen adsorption capacity is low even with adsorption selectivity for nitrogen, and therefore, efficiency of a nitrogen-containing gas separation process decreases. Meanwhile, when the density is greater than 10 mmol/g, the metal-organic framework is difficult to be formed structurally, and this density is also difficult to be obtained experimentally.

Preferably, the metal-organic framework having a coordinatively unsaturated metal site may include a trivalent chromium ion, a cobalt ion, a tungsten ion, a molybdenum ion, a ruthenium ion, a niobium ion, a manganese ion, a nickel ion, a copper ion, a zinc ion, a titanium ion or a zirconium ion as a metal. More preferably, the metal-organic framework having a coordinatively unsaturated metal site may include at least one component among a trivalent chromium ion, a cobalt ion, a tungsten ion or a molybdenum ion as a metal. The chromium, the tungsten and the molybdenum are ligands of enzyme mimicking organic metal compounds, and are metals known to involve in a nitrogen fixation reaction inducing nitrogen molecule coordination and ammonia reduction therefrom, and accordingly, may be used as a metal component having specific adsorptivity for nitrogen.

The metal-organic framework including the metal ions may be prepared using an organic material ligand forming a general metal-organic framework without limit. For example, one or more of 1,4-benzenedicarboxylic acid (BDCA), isophthalic acid, 1,3,5-benzenetricarboxylic acid (BTCA), 2,5-dihydroxyterephthalic acid; or 2,5-dihydroxy-1,4-benzene dicarboxylic acid, 2-aminoterephthalic acid, 2-nitroterephthalic acid, 2-methylterephthalic acid, 2-haloterephthalic acid, azobenzene tetracarboxylic acid, 1,3,5-tri(4-carboxyphenyl)benzene, 2,6-naphthalene dicarboxylic acid (NDCA), benzene-1,3,5-tribenzoic acid (BTB), fumaric acid, glutaric acid, 2,5-furanedicarboxylic acid (FDCA), 1,4-pyridinedicarboxylic acid, 2-methylimidazole, alkyl-substituted imidazole, aromatic ring-substituted imidazole, 2,5-pyrazinedicarboxylic acid, 1,4-benzene dipyrazole, 3,5-dimethyl-pyrazolate-4-carboxylate, 4-(3,5-dimethyl-1H-pyrazol-4-yl)benzoate, 1,4-(4-bispyrazolyl)benzene, or derivatives thereof may be used. Preferably, 1,4-benzenedicarboxylic acid, 1,3,5-benzenetricarboxylic acid, 2,5-dihydroxyterephthalic acid, 2,6-naphthalene dicarboxylic acid, azobenzene tetracarboxylic acid or derivatives thereof, may be used, however, the organic material ligand is not limited thereto.

Preferably, the metal-organic framework having nitrogen selective adsorptivity of the present invention may be pretreated at 130° C. to 300° C. More preferably, pretreatment may be carried out at 150° C. to 300° C., however, the pretreatment condition is not limited thereto as long as higher adsorptivity is obtained for nitrogen compared to methane, oxygen, argon and the like. When the pretreatment temperature is low of less than 130° C., specific adsorptivity showing a significantly higher adsorption amount for specific gas compared to other gases is not obtained, and specific adsorptivity may be lost with similar adsorption amounts for all gases, and it is considered to be caused by a solvent or unreacted residues blocking pore mouths of a metal-organic framework, leading to the gas to be adsorbed passing through the inside of the porous metal-organic framework without sufficient contact. The treatment temperature is only an example and may be adjusted when a solvent removing condition or treatment time is different.

In addition, as described above, the above-mentioned process may be carried out using known solvent removing methods such as vacuum treatment, solvent exchange and ultrasonic treatment without limit.

The nitrogen selective adsorbent according to the present invention may be used provided on device separating methane and nitrogen in nitrogen-containing natural gas or shale gas. In addition, the nitrogen selective adsorbent may be used provided on a device separating nitrogen and oxygen in nitrogen-containing air, and may be used provided on a device separating nitrogen, oxygen and argon in air combined with an oxygen selective adsorbent.

In addition, nitrogen, oxygen or argon may be separated from a gas mixture containing nitrogen, oxygen or argon using a method including a first step of treating with the nitrogen adsorbent according to the present invention; and a second step of treating with an oxygen adsorbent, wherein the first step and the second step are carried out either in consecutive order or in reverse order.

Herein, the nitrogen adsorbent and the oxygen adsorbent may be arranged either in consecutive order or in reverse order along the flow of a gas mixture to separate. For example, by passing air through the nitrogen adsorbent first and then passing the nitrogen-removed air through the oxygen adsorbent, oxygen is removed and argon gas with increased purity is obtained, and nitrogen gas and oxygen gas collected in each of the adsorbents are desorbed and collected to obtain nitrogen and oxygen with increased purity. Alternatively, by passing air through the oxygen-specific adsorbent first and then passing the oxygen-removed air through the nitrogen adsorbent, nitrogen is removed and argon gas with increased purity is obtained, and oxygen gas and nitrogen gas collected in each of the adsorbents are desorbed and collected to obtain oxygen and nitrogen with increased purity. The order of combining the adsorbents is not limited as long as the 3 gases are separated each with high purity.

The nitrogen selective adsorbent according to the present invention may also be used in a liquefaction system and a liquefaction technology liquefying high purity gases such as nitrogen, methane and oxygen prepared using the adsorbent by pressurizing the gases. By liquefying the separated gases as above, the separated gases may be readily transported, stored and/or distributed.

As described above, the nitrogen selective adsorbent may include a trivalent chromium ion, a cobalt ion, a tungsten ion, a molybdenum ion, a ruthenium ion, a niobium ion, a manganese ion, a nickel ion, a copper ion, a zinc ion, a titanium ion or a zirconium ion as a metal. More preferably, the metal-organic framework having a coordinatively unsaturated metal site may include at least one component among a trivalent chromium ion, a cobalt ion, a tungsten ion or a molybdenum ion as a metal. Herein, the type of an organic material used is not limited. A trivalent chromium ion, a cobalt ion, a tungsten ion, a molybdenum ion or the like has superior adsorptivity for nitrogen compared to gas such as oxygen or argon, and therefore, is capable of selectively adsorbing nitrogen.

The nitrogen selective adsorbent according to the present invention includes a porous metal-organic framework in various forms such as powders, pellets, spheres, monoliths, membranes, fiber fabrics and films. While a gas mixture including nitrogen passes through a porous metal-organic framework interior, nitrogen molecules having particularly high adsorptivity are first adsorbed to the metal-organic framework interior. Accordingly, in order to have a more significant difference in the adsorption amount, the porous metal-organic framework preferably has a wide surface area so that gas molecules have better access to the surface while freely entering the porous metal-organic framework interior. Accordingly, the metal-organic framework preferably has a pore size of 0.4 nm to 20 nm, however, the size is not limited thereto.

Preferably, the nitrogen selective adsorbent according to the present invention may be installed on a pressure swing adsorption (PSA) separation device or a temperature swing adsorption (TSA) separation device as a nitrogen separation device including the same, but the device is not limited thereto, and the nitrogen selective adsorbent may be used as a nitrogen separation system in various nitrogen separation devices known in the art.

The PSA separation method is a gas separation and purification method using a principle of selectively adsorbing specific gas in a gas mixture at a high pressure and then lowering the pressure to desorb the adsorbed gas. More specifically, a step of pressurization pressurizing generally with atmospheric pressure or higher in order to adsorb large quantities of gas to one or more adsorption columns or adsorption beds filled with an adsorbent selectively adsorbing target gas, a step of blowdown depressurizing to desorb the adsorbed gas, and a step of purge for collecting the desorbed gas, and the like, are continuously or repetitively carried out to separate and purify selectively adsorbed gas and gas not favorably adsorbed with high purity. As the decompression, the adsorbed gas is desorbed at 1 atmosphere or lower using a vacuum pump, and such a method is referred to as a vacuum swing adsorption (VSA) separation method. In the above-mentioned method, working capacity of the gas collected from the adsorbent is defined by a difference between an adsorption amount under a fixed adsorption temperature and pressure condition and an adsorption amount remaining in the adsorbent under a desorption temperature and pressure condition. In addition, the TSA separation method generally includes a step of pressurization pressurizing generally with atmospheric pressure or higher in order to adsorb gas to one or more adsorption columns or adsorption beds filled with an adsorbent selectively adsorbing target gas, which is similar to the PSA separation method, and a step of regeneration regenerating the adsorbent by heating to a temperature higher than the adsorption temperature in order to desorb the adsorbed gas. Herein, working capacity of the gas collected from the adsorbent is the same as defined in the PSA separation method. The PSA separation method and the TSA separation method are commercially used in separating nitrogen/oxygen in air, separating methane/nitrogen in natural gas, purifying hydrogen from syngas in a methane steam reforming process, separating methane/carbon dioxide in biogas, drying moisture in compressed air and natural gas, and the like.

Figure 1:
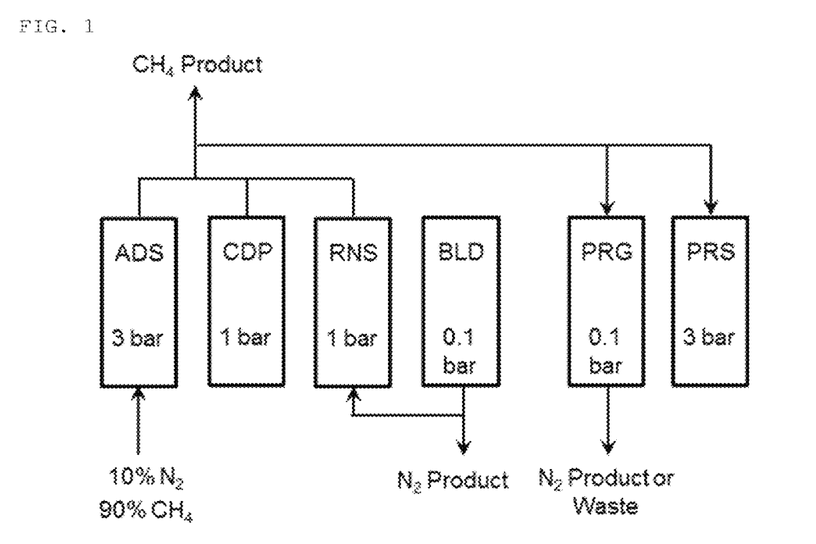
FIG. 1 is a diagram schematically showing a process separating methane and nitrogen in natural gas using a nitrogen selective adsorbent according to the present invention and a PSA separation method. ADS represents an adsorption step, CDP represents a cocurrent depressurization step, RNS represents a rinse step, BLD represents a blowdown step, PRG represents a purge step, and PRS represents a pressurization step.

In the present invention, an object of separating nitrogen from a nitrogen-containing gas mixture such as natural gas, shale gas and air or separating main components of a gas mixture may be accomplished by filling an adsorption column or adsorption bed with the nitrogen selective adsorbent of the present invention, and then carrying out a PSA separation method, a VSA separation method, a TSA separation method or a combination thereof. For example, a process of separating methane and nitrogen in natural gas using the nitrogen selective adsorbent of the present invention and the PSA separation method may include 6 steps as shown in FIG. 1.

In the above-mentioned process for separating methane and nitrogen, the ADS adsorption step may be generally operated in an adsorption temperature range of −20° C. to 80° C., and an adsorption pressure range of 0.5 atmosphere to 10 atmosphere, and in the CDP scalar depressurization step, a desorption temperature may employ the same or higher temperature than the adsorption temperature, and a desorption pressure may generally be lower than the adsorption pressure by 0.5 atmosphere or higher.

In order to experimentally measure a separation ability for a nitrogen-containing gas mixture using an adsorption separation device equipped with an adsorbent, or to develop a process, the adsorbent is preferably filled to an adsorption column or adsorption bed in a molded form instead of a powder form to minimize a pressure drop difference. The molded adsorbent may have various forms such as granules, spheres, elliptical semi-spheres, cylindrical pellets and monoliths, and the size may be generally selected in a range between 0.5 mm to 10 mm depending on the standard of an adsorption column or adsorption bed.

In addition to the molded adsorbent, the nitrogen selective adsorbent may be used with other materials to be prepared to a hollow fiber type, that is, a hollow cylindrical membrane, known as an efficient structure capable of providing a large surface area in order to be efficiently used in an adsorption separation system. The hollow fiber-type membrane may be impermeable hollow fiber in which an outer surface layer is gas permeable and an inner surface layer includes a non-gas-permeable lumen layer, and may be a hollow fiber-type separation membrane in which a separation membrane is molded into a hollow cylinder. Preferably, the adsorbent may be a hollow fiber or hollow fiber-type separation membrane molded into a hollow fiber form by adding the nitrogen selective adsorbent of the present invention to an existing material used for hollow fiber or separation membrane preparation, and containing an organic-inorganic hybrid nanoporous material having a coordinatively unsaturated metal site in the skeleton, surface or pores. For example, when using an impermeable hollow fiber, a hollow fiber hybrid adsorbent prepared by embedding nitrogen selective hybrid nanoporous adsorbent particles in a hollow fiber may be used. A hollow fiber hybrid adsorbent containing a polymer fiber and Zeolite adsorbent particles has been reported to be effective in gas separation (*Ind. Eng. Chem. Res.*, 48: 7314-7324 (2009)). Although no cases using a hollow fiber hybrid adsorbent in selectively separating nitrogen from a nitrogen-containing gas mixture have not been reported, nitrogen and the remaining gases may be effectively adsorbed and separated when the nitrogen selective hybrid nanoporous adsorbent of the present invention is used instead of Zeolite in the adsorbent. In the hollow fiber, the inner surface layer forms a lumen layer having no permeability, and the outer surface layer is gas permeable, and therefore, it is possible to flow cold water and steam to the empty inner space of the lumen layer by turns, and a TSA separation method may be carried out by using cold water when gas is adsorbed, and using steam when the gas is desorbed. In addition, the nitrogen selective adsorbent may be used in a separation membrane and molded into a hollow fiber form to be used for separating and purifying nitrogen-containing gas. For example, a hollow fiber mixed matrix MOF membrane may be prepared using a spinning method by mixing a polymer for a separation membrane and the nitrogen selective hybrid nanoporous powder according to the present invention in a similar manner to the hollow fiber hybrid adsorbent, and dispersing the result into a solvent, such a hollow fiber mixed matrix MOF membrane may be effectively used in separating nitrogen and methane in nitrogen-containing natural gas or shale gas, or separating nitrogen and oxygen in air by using a membrane separation system formed by tying numerous fiber bundles and modularizing the result to a cartridge form.

In the device for separating nitrogen, oxygen or argon of the present invention, oxygen adsorbents known in the art may be used as an oxygen adsorbent without limit. Preferably, an organic-inorganic hybrid nanoporous material, Zeolite or carbon molecular sieves may be used, but the oxygen adsorbent is not limited thereto.

When using an organic-inorganic hybrid nanoporous material as the oxygen adsorbent, the organic-inorganic hybrid nanoporous material may include an iron ion or divalent chromium ion as a metal, however, the metal is not limited thereto.

Existing oxygen adsorbents exhibit excellent adsorptivity for oxygen compared to nitrogen, however, most of these oxygen adsorbents have a disadvantage in that oxygen and argon are difficult to be separated since they exhibit no specificity for oxygen and argon separation. However, in the specific examples of the present invention, it is identified that MIL-100(Fe), a metal-organic framework including iron, exhibits significantly low adsorptivity for argon compared to oxygen and nitrogen. Accordingly, it is identified that argon is capable of being efficiently separated from a mixture of nitrogen and/or oxygen and argon using the MIL-100(Fe). Furthermore, by combining the MIL-100(Fe) with a nitrogen adsorbent, it is identified that, when air passing through the nitrogen adsorbent, that is, a mixture of oxygen and argon, passes through the oxygen adsorbent according to the present invention, nitrogen, oxygen and argon are capable of being separated each with high purity.

When Zeolite is used as the oxygen adsorbent, alkali ion Zeolite or alkali earth metal ion Zeolite may be used as the Zeolite, however, the Zeolite is not limited thereto. The Zeolite capable of being used as the oxygen adsorbent includes LiX Zeolite, CaX Zeolite, and the like. However, these are nonlimiting examples of the oxygen adsorbent, and the scope of the present invention is not limited thereto.

The device for separating nitrogen, oxygen or argon according to the present invention may further include a moisture adsorbent. The separation device according to the present invention includes an organic-inorganic hybrid nanoporous material as the nitrogen adsorbent and/or the oxygen adsorbent. The skeleton structure of the organic-inorganic hybrid nanoporous material may be destroyed when brought in contact with moisture, and accordingly, separation ability of a separation device including the same may decline or a lifespan thereof may be shorten. Meanwhile, air may include moisture, and moisture content in air changes depending on various environmental factors such as humidity. Accordingly, in order to prevent the structure of an organic-inorganic hybrid nanoporous material used as the nitrogen adsorbent and/or the oxygen adsorbent being destroyed by moisture included in air, the organic-inorganic hybrid nanoporous material itself is modified to have a damp proof property, or a step of removing moisture by additionally including a moisture-specific adsorbent may be further carried out. When moisture is removed using the moisture adsorbent, this is preferably carried out prior to passing air through the nitrogen adsorbent and the oxygen adsorbent, however, the order is not limited thereto.

Helium, neon and argon, which are inert gases, are also known as noble gases since these gases are low in the content in air and are not active. Such inert gases are expensive compared to general gases, and have low adsorptivity on the solid surface, therefore, are not readily adsorbed or separated when being mixed with gases having relatively low activity such as nitrogen, and have to be destroyed without being collected. However, a hybrid nanoporous adsorbent having a coordinatively unsaturated metal site exhibiting nitrogen selectivity as in the present invention has selective adsorptivity for nitrogen gas compared to the inert gases, and therefore, when using the nitrogen separation device equipped with this adsorbent, nitrogen is capable of being effectively separated from a gas mixture including nitrogen and at least one component among helium, neon, argon or hydrogen, which are inert gases.

Meanwhile, hydrogen is gas widely used in a chemical industry, and is normally prepared using a natural gas or naphtha modifying process, and is relatively more expensive than nitrogen. Hydrogen is readily chemical adsorbed on a surface of a metal including a precious metal, however, regeneration thereof needs a high temperature, and hydrogen has low adsorptivity for a porous surface with a high surface area, and therefore, does not have high adsorption efficiency. When hydrogen and relatively inert nitrogen gas are mixed, they are not readily separated by a difference in the interaction with the adsorbent surface when using an existing hybrid nanoporous adsorbent, and in order to separate these gases, a difference in the adsorption amount or rate of hydrogen and nitrogen caused by pore sizes is used. For example, hybrid nanoporous $Mn(HCO_2)_2$ synthesized from Mn and formic acid shows a behavior adsorbing only hydrogen and hardly adsorbing nitrogen at an adsorption isotherm of low temperature of 78 K or −195° C. (*J. Am. Chem. Soc.*, 126: 32-33 (2004)). However, when using the nitrogen separation device equipped with a hybrid nanoporous an adsorbent having a coordinatively unsaturated metal site with nitrogen selectivity as in the present invention, nitrogen is selectively adsorbed instead of selectively adsorbing hydrogen, and as a result, hydrogen may be effectively purified from a gas mixture containing nitrogen and hydrogen even at an adsorption temperature of −20° C. to 80° C. and preferably at a temperature of 0° C. or higher.

Liquefaction of natural gas having methane as a main component is a process needed to store methane as a fuel or a chemical fuel, or readily transport methane from a place of production to a place of use. Meanwhile, with high purity nitrogen, oxygen and the like used for medical or experimental purposes, a liquefying process is preferably carried out additionally for the convenience of storage and/or transport after separating each gas from air.

Figure 2:
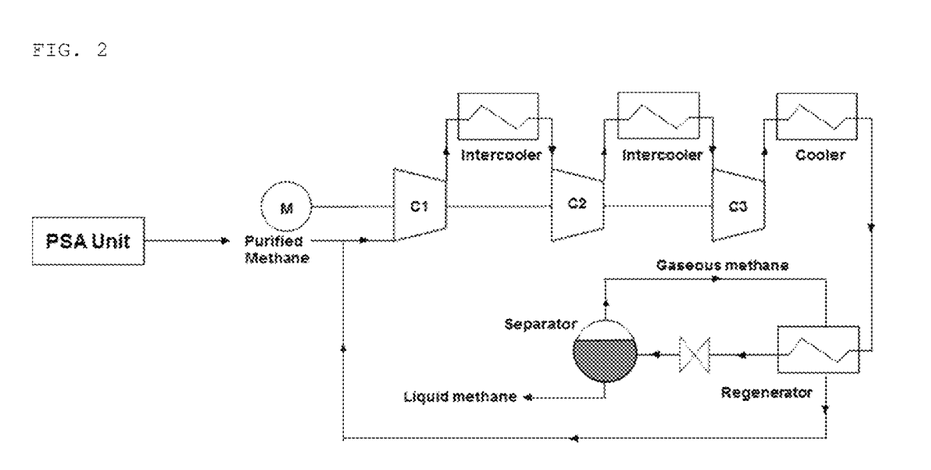
FIG. 2 is a diagram schematically showing a process preparing liquefied methane using a nitrogen selective adsorbent according to the present invention and a PSA separation method, and further including a liquefying process. C1 to C3 means a multi-step compressor, and PSA means pressure swing adsorption.

For example, a low temperature liquefaction cycle of methane, a main component of natural gas, may be formed with a series of processes such as multi-step compression, cooling, heat generation, constant enthalpy or adiabatic expansion, as in a Linde cycle liquefying process shown in FIG. 2. At a low temperature range of 63° C. to 82° C. or 210 K to 191 K, methane liquefaction is generally progressed when being compressed with a high pressure of up to 100 atmosphere. The state of methane to liquefy may be different depending on the separation and purification method of the methane, however, when methane is purified using a PSA separation and purification device equipped with the nitrogen selective adsorbent of the present invention, methane is obtained with a temperature of −20° C. to 80° C., and a pressure of 0.1 atmosphere to 10 atmosphere, and therefore, multi-step compression of 3 or more steps is required to liquefy the gas by compression with 100 atmosphere and cooling to 63° C. or lower. Herein, a heat-exchanger-type cooler may be used to remove the heat generated in the middle of a compressor. In addition, a separator for separating liquefied methane and methane in a gas state may be used, and the obtained methane in a gas state is refluxed and reused in a liquefying process, and the obtained LNG, liquefied natural gas methane, may be either stored using a transfer facility, or transported to a place of use using transport means such as a tank truck, an LNG carrying vessel and a pipeline. A specific example of the device is shown in FIG. 2.

In addition, the present invention may provide a method for preparing high purity argon separated from an argon-containing gas mixture including oxygen, nitrogen and mixtures thereof, the method including adsorbing the gas on an organic-inorganic hybrid nanoporous material MIL-100 (Fe) solvent containing iron as a central metal; and collecting the permeated gas.

As described above, in the specific examples of the present invention, it is identified that an organic-inorganic hybrid nanoporous material MIL-100(Fe) containing iron as a central metal exhibits significantly low adsorptivity for argon compared to oxygen and nitrogen. Accordingly, argon is capable of being efficiently separated from a mixture of nitrogen and/or oxygen and argon using the same, and by collecting the permeated gas, that is, argon gas, argon is separated from a gas mixture additionally including nitrogen and/or oxygen, and obtained with high purity.

Hereinafter, the present invention will be described in more detail with reference to examples. However, these examples are for illustrative purposes only, and the scope of the present invention is not limited to these examples.

Figure 3:
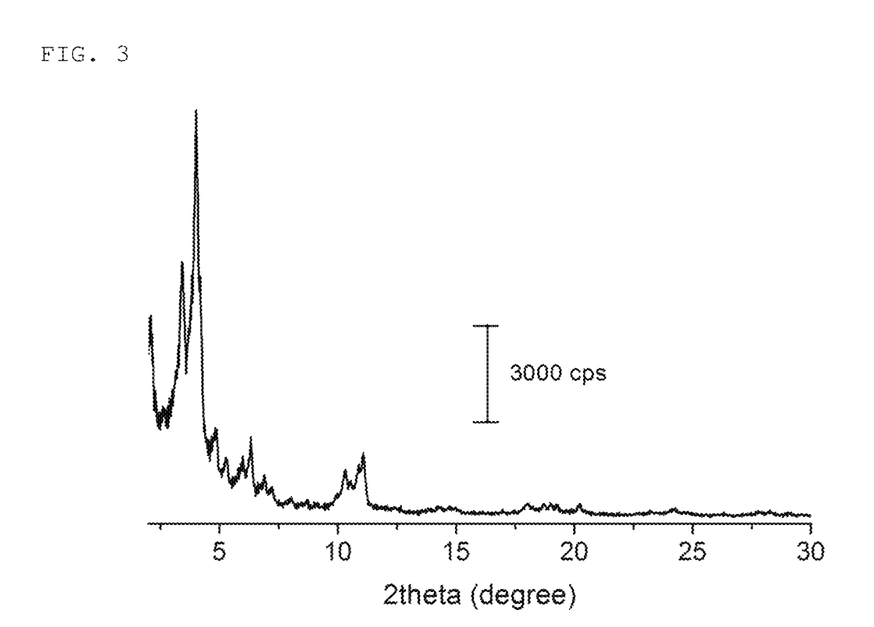
FIG. 3 is an X-ray diffraction spectrum of MIL-100(Cr) adsorbent powder.
Figure 4:
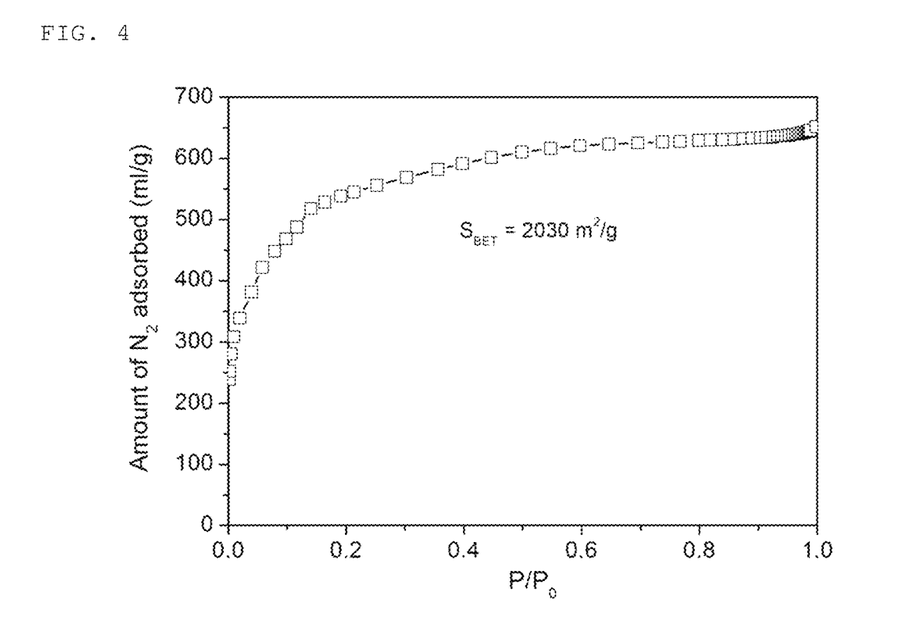
FIG. 4 is a diagram showing a physical adsorption isotherm of nitrogen measured at a low temperature of −196° C. in an MIL-100(Cr) adsorbent.

Preparation Example 1: Preparation of Hybrid Nanoporous Material MIL-100(Cr) Using Hydrothermal Synthesis After adding 0.52 g of chrome metal and 1.41 g of 1,3,5-benzenetricarboxylic acid (BTCA) to a 100 ml capacity Teflon reactor, 48 g of water and 4 ml of HF were added thereto to make a final molar ratio of the reactants be $Cr:BTCA:H_2O:HF=1:0.67:289:2$. After stirring the Teflon container containing the reactants for 30 minutes at room temperature, the container was installed on an autoclave reactor, and a crystallization reaction was carried out for 2 days at 220° C. in an electric heating oven. A High purity sample with unreacted organic ligands and inorganic salt impurities remaining in the pores or sticking to the chrome coordination site being removed was obtained using a 3-step purification method in which the product cooled to room temperature was washed with boiling water, washed with ethanol heated at 60° C., and pretreated at 60° C. using an aqueous $NH_4F$ solution. A hybrid nanoporous material MIL-100(Cr) was obtained by drying the purified sample at 100° C. On the obtained MIL-100(Cr) adsorbent powder, an X-ray diffraction spectrum was obtained using an X-ray diffraction spectrometer manufactured by Rigaku Corporation and a Cu Kα beam line, and shown in FIG. 3. The crystal XRD pattern of the final product was identified to be the same as the value disclosed in a literature (*Angew. Chem. Int. Ed.*, 43: 6296 (2004)). The finally obtained sample was pretreated for 6 hours under vacuum of approximately $1 \times 10^{-5}$ torr at 250° C., and then a physical adsorption isotherm of nitrogen was measured at a low temperature of −196° C. and shown in FIG. 4. A BET specific surface area calculated therefrom was 2030 $m^2/g$. In addition, the concentration of the coordinatively unsaturated chrome site obtained by quantitatively measuring this sample by CO and NO chemical adsorption was calculated to be from 2.2 to 3.5 mmol/g when changing the pretreatment temperature from 150° C. to 250° C. Under the synthesis condition described above, an MIL-100(Cr) sample having the same structure without a fluorine component may be prepared by adding nitric acid instead of HF, and this sample is also capable of being used as a nitrogen selective adsorbent.

Preparation Example 2: Preparation of Hybrid Nanoporous Material MIL-101(Cr) Using Hydrothermal Synthesis After adding 4 g of $Cr(NO_3)_3 \cdot 9H_2O$ and 1.66 g of 1,4-benzenedicarboxylic acid (BDCA) to a 100 ml capacity Teflon reactor, 48 g of water and 2 ml of HF were added thereto to make a final molar ratio of the reactants be $Cr:BDCA:H_2O:HF=1:1:265:0.25$. The Teflon container containing the reactants was installed on an autoclave reactor, and a crystallization reaction was carried out for 8 hours at 220° C. in an electric heating oven. A high purity sample with unreacted organic ligands and inorganic salt impurities remaining in the pores or sticking to the chrome coordination site being removed was obtained using a 3-step purification method in which the product cooled to room temperature was washed with boiling water, washed with ethanol heated at 60° C., and pretreated at 60° C. using an aqueous $NH_4F$ solution. A hybrid nanoporous material MIL-101(Cr) was obtained by drying the purified sample at 100° C. The crystal XRD pattern of the final product was identified to be the same as the value disclosed in a literature (*Science*, 309: 2040 (2005)). The finally obtained sample was pretreated for 6 hours under vacuum of approximately $1 \times 10^{-5}$ torr at 250° C., then a physical adsorption isotherm of nitrogen was measured at a low temperature of −196° C., and a BET specific surface area calculated therefrom was 3950 m²/g. In addition, the concentration of the coordinatively unsaturated chrome site obtained by quantitatively measuring this sample by CO and NO chemical adsorption was calculated to be approximately 2.9 mmol/g at a pretreatment temperature of 250° C. Under the synthesis condition described above, an MIL-100(Cr) sample having the same structure without a fluorine component may be prepared by excluding HF and adjusting the pH to 2 or lower, and this sample is also capable of being used as a nitrogen selective adsorbent.

Preparation Example 3: Preparation of Hybrid Nanoporous Material CPO-27(Co) Using Microwave Synthesis After adding 8.67 mmol of $Co(NO_3)_2 \cdot 6H_2O$ and 2.43 mmol of 2,5-dihydroxyterephthalate (DHT) to a Teflon reactor, a total volume of 50 ml of DMF-ethanol-water was added in 1:1:1 (v/v/v) as a solvent. A reaction mixture was prepared by stirring the reactants at 50 rpm for 20 minutes at room temperature. The Teflon reactor containing the reactants was installed on a microwave reactor (manufactured by CEM Corporation, model Mars-5), and a crystallization reaction was carried out by raising the temperature to 100° C. with microwave (2.54 GHz) irradiation, and maintaining the temperature for 1 hour. A hybrid nanoporous material CPO-27(Co) was obtained by cooling the result to room temperature, washing with distilled water, and then drying. The crystal XRD pattern of the final product was identified to be the same as the value disclosed in a literature (*J. Am. Chem. Soc.*, 130: 10870 (2008)). The finally obtained sample was pretreated for 6 hours under vacuum of approximately $1 \times 10^{-5}$ torr at 250° C., then a physical adsorption isotherm of nitrogen was measured at a low temperature of −196° C., and a BET specific surface area calculated therefrom was 1420 m²/g. In addition, the concentration of the coordinatively unsaturated cobalt site obtained by quantitatively measuring this sample by CO and NO chemical adsorption was calculated to be approximately 5.9 mmol/g.

Preparation Example 4: Preparation of Hybrid Nanoporous Material MIL-100(Fe) Using Hydrothermal Synthesis After adding 67 mmol of iron(III) nitrate ($Fe(NO_3)_3 \cdot 6H_2O$) and 44 mmol of 1,3,5-benzenetricarboxylic acid (BTCA) to a Teflon reactor, distilled water was added thereto to make a final molar ratio of the reactants be $Fe:BTCA:H_2O=1:0.66:278$. The reactants were stirred at 500 rpm for 20 minutes at room temperature to be uniform. A crystallization reaction was carried out by maintaining the reactor containing the reactants at 160° C. for 12 hours. A high purity sample with unreacted organic ligands and inorganic salt impurities remaining in the pores or sticking to the iron coordination site being removed was obtained using a 3-step purification method in which the product cooled to room temperature was washed with boiling water, washed with ethanol heated at 60° C., and pretreated at 60° C. using an aqueous $NH_4F$ solution. A hybrid nanoporous material MIL-100(Fe) was obtained by drying the purified sample at 100° C. The crystal XRD pattern of the final product was identified to be the same as the value disclosed in a literature (*Chem. Commun.*, 2820 (2007)). The finally obtained sample was pretreated for 6 hours under vacuum of approximately $1 \times 10^{-5}$ torr at 250° C., then a physical adsorption isotherm of nitrogen was measured at a low temperature of −196° C., and a BET specific surface area calculated therefrom was 2250 m²/g. In addition, the concentration of the coordinatively unsaturated iron site obtained by quantitatively measuring this sample by CO and NO chemical adsorption was calculated to be approximately 3.5 mmol/g.

Preparation Example 5: Preparation of Hybrid Nanoporous Material MIL-100(Cr/Fe) Using Microwave Hydrothermal Synthesis After adding a chromium metal, iron nitrate and 1,3,5-benzenetricarboxylic acid to a 100 ml Teflon reactor provided by CEM Corporation, 48 g of water and 4 ml of HF were added thereto to make a final molar ratio of the reactants be $Cr:Fe:BTCA:H_2O:HF=0.5:0.5:0.67:278:2$. The reactants were placed in a Teflon container and stirred for 30 minutes at room temperature, and a crystallization reaction was carried out by placing the result in a MARS-5 microwave oven manufactured by CEM Corporation, raising the temperature from room temperature to 200° C. for 10 minutes with electric power of 500 W, and hydrothermal synthesizing the result for 50 minutes after the temperature reached 200° C. After that, the pressure in the Teflon reactor was released, and a high purity sample with unreacted organic ligands and inorganic salt impurities remaining in the pores or sticking to the metal coordination site being removed was obtained using a 3-step purification method in which the product cooled to room temperature was washed with boiling water, washed with ethanol heated at 60° C., and pretreated at 60° C. using an aqueous $NH_4F$ solution. Hybrid nanoporous material powder was obtained by drying the purified sample at 100° C. The crystal XRD pattern of the final product was the same as the XRD pattern of the MIL-100(Cr) obtained in Preparation Example 1, and synthesis of an MIL-100(Cr/Fe) material containing chromium and iron ions in the skeleton was identified therefrom.

Preparation Example 6: Molding of Hybrid Nanoporous Material for Application in Adsorption Separation In order to experimentally measure a separation ability for a nitrogen-containing gas mixture of an adsorbent using breakthrough adsorption separation or PSA, TSA adsorption separation technologies, or to develop a process, the adsorbent was filled to an adsorption column or adsorption bed in a form molded to a sphere having a size of sub mm to a few mm instead of powder to minimize a pressure drop difference.

In this preparation example, a sphere was prepared using the following method as a molded hybrid nanoporous material exhibiting a nitrogen selective adsorption property. First, 30 g of the MIL-100(Cr) powder obtained in Preparation Example 1 was prepared. 3% by weight of polyvinyl butyral (PVB) based on the weight of the hybrid nanoporous material powder was dissolved in 90% by weight of ethanol, and then a mixture in a paste state was prepared by mixing the result with the prepared MIL-100(Cr) powder. The mixture was mechanically pulverized to prepare a lump of MIL-100 (Cr) powder having a uniform size of approximately 1 to 2 mm. The lump of powder was placed in a cylinder, and a spherical or elliptical molded product having a diameter range of 1 mm to 2.5 mm or 2.5 mm to mm was prepared by rotating the lump of powder while adjusting the time at a rotation speed of 100 rpm to 250 rpm. The obtained molded product was dried under vacuum for 10 hours at 120° C. in a vacuum dry oven, and then installed on an adsorption column to be used in adsorption separation tests. Herein, a BET surface area of the obtained molded product having an average diameter of 2.5 mm was high at 1930 m$^2$/g, a 95% level compared to the surface area of the powder.

Example 1: Adsorption Isotherm of Methane and Nitrogen and Separation of Nitrogen from Methane/Nitrogen Gas Mixture Using MIL-100(Cr)

Separation of nitrogen from a mixture of methane and nitrogen using the MIL-100(Cr) prepared according to Preparation Example 1 as an adsorbent was identified. A Monosorb gas adsorption device manufactured by Qunatachrome Instruments was used to adsorb nitrogen and methane. Each adsorption condition of methane and nitrogen gas changed up to 1 bar at 10° C. 100 mg of the MIL-100(Cr) powder was used as the adsorbent for gas adsorption. The adsorbent was cooled to 25° C. and used after carrying out pretreatment of heating for 6 hours at 250° C. Isotherms for nitrogen and methane adsorption were obtained using the MIL-100(Cr) as the adsorbent, and shown in FIG. 5.

Figure 5:
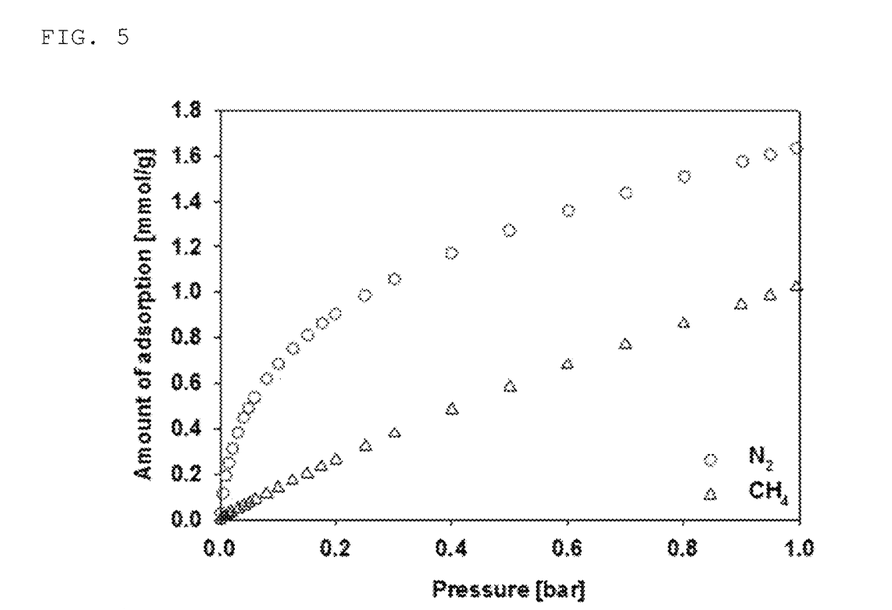
FIG. 5 is a diagram showing isotherms for nitrogen and methane adsorption in a range of an adsorption temperature of 10° C. and an adsorption pressure of 1 atmosphere in an MIL-100(Cr) adsorbent.

As shown in FIG. 5, the MIL-100(Cr) adsorbent was identified to exhibit significantly high adsorptivity for nitrogen compared to methane in the whole pressure range measured. This indicates that the MIL-100(Cr) adsorbent is useful in separating nitrogen from natural gas and shale gas, a gas mixture having methane as a main component and including nitrogen gas in various content.

Based on the result shown above, selectivity of nitrogen for methane was calculated up to 1 atmosphere for a gas mixture including 90% of methane and 10% of nitrogen gas assuming the nitrogen content included in natural gas using an ideal adsorption solution theory, and as a result, it was identified that high nitrogen selectivity from minimum 7 to maximum 23 was exhibited. This indicates that nitrogen in natural gas is capable of being more efficiently separated than methane under an atmospheric condition using the MIL-100(Cr).

Meanwhile, in the MIL-100(Cr) sample having a BET specific surface area of 1800 m$^2$/g or less, a selective adsorption property for nitrogen was difficult to be exhibited since a fair amount of impurities remained in the pores, and the coordinatively unsaturated chrome site was not able to properly perform as an adsorption site, therefore, it was identified that, special care needs to be taken in a purification step after the synthesis in order to obtain a high purity MIL-100(Cr) sample.

Example 2: Separation of Nitrogen from Air Using MIL-100 (Cr)

Separation of nitrogen from air using the MIL-100(Cr) prepared according to Preparation Example 1 as an adsorbent was identified. For nitrogen and oxygen adsorption, a Monosorb gas adsorption device manufactured by Qunatachrome Instruments was used up to 1 atmosphere, and an IGA weight analyzer manufactured by Hiden Isochema Ltd. was used at a high pressure of 1 atmosphere or higher. Each adsorption condition of nitrogen and oxygen gas changed up to 20 atmosphere at 20° C. or 25° C. As the adsorbent for gas adsorption, 100 mg of the MIL-100(Cr) powder was weighed and used for the Monosorb gas adsorption device, and 30 mg of the MIL-100(Cr) powder for the IGA weight analyzer. The adsorbent was cooled to 25° C. and used after carrying out pretreatment of heating for 6 hours at 250° C. Isotherms for nitrogen and oxygen adsorption were obtained using the MIL-100(Cr) as the adsorbent, and shown in FIG. 6.

Figure 6:
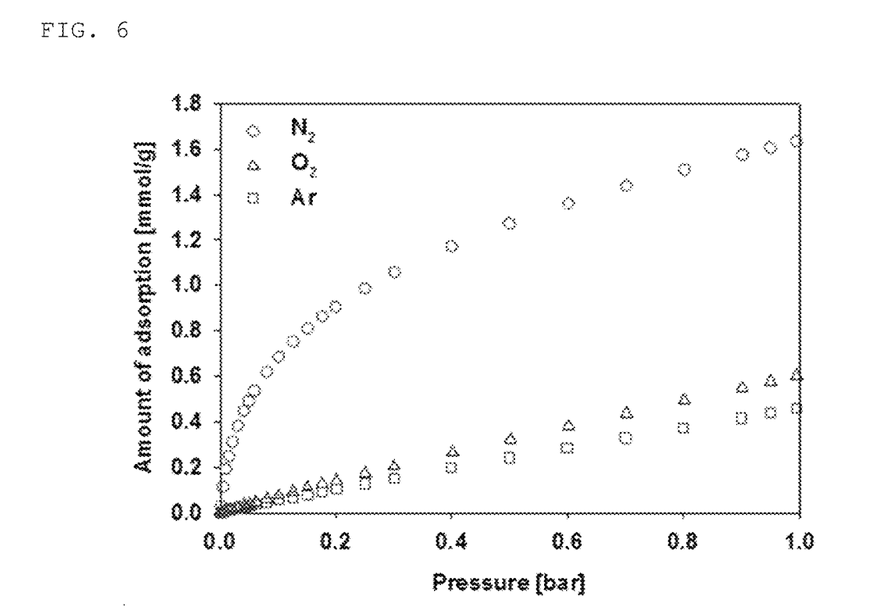
FIG. 6 is a diagram showing isotherms for nitrogen, oxygen and argon adsorption in a range of an adsorption temperature of 10° C. and an adsorption pressure of 1 atmosphere in an MIL-100(Cr) adsorbent.

As shown in FIG. 6, the MIL-100(Cr) adsorbent was identified to exhibit significantly high adsorptivity for nitrogen compared to oxygen in the whole pressure range measured. This indicates that the MIL-100(Cr) adsorbent is useful in separating nitrogen from air, a gas mixture including approximately 79% of nitrogen, 21% of oxygen and less than 1% of argon.

Based on the result shown above, selectivity of nitrogen for oxygen was calculated up to 1 atmosphere for a gas mixture including 79% of nitrogen and 21% of oxygen, which is similar to atmospheric air, using an ideal adsorption solution theory, and as a result, it was identified that high nitrogen selectivity from minimum 6 to maximum 17.5 was exhibited. This indicates that nitrogen in air is capable of being efficiently separated under an atmospheric condition using the MIL-100(Cr).

Example 3: Separation of Nitrogen and Inert Gas Argon Using MIL-100(Cr)

Separation of nitrogen from a gas mixture of nitrogen and argon, one type of inert gas, using the MIL-100(Cr) prepared according to Preparation Example 1 as an adsorbent was identified. An adsorption device and an adsorption condition for adsorbing nitrogen and argon are the same as in Example 2. Isotherms for nitrogen and argon were obtained using the MIL-100(Cr) as the adsorbent, and shown in FIG. 6 together with the adsorption isotherm for oxygen.

As shown in FIG. 6, the MIL-100(Cr) was identified to exhibit significantly high adsorptivity for nitrogen compared to argon in the whole pressure range measured. An argon adsorption amount was 0.42 mmol/g and a nitrogen adsorption amount was 1.61 mmol/g at 1 atmosphere, and the nitrogen adsorption amount was identified to be higher by approximately 4 times or greater than the argon adsorption amount. Such a result indicates that nitrogen is capable of being separated from a gas mixture including nitrogen, and helium, neon, argon and the like, which are inert gases, using the MIL-100(Cr) as the adsorbent, or inert gases are capable of being selectively collected.

Example 4: Separation of Nitrogen from Air Using MIL-101 (Cr)

Separation of nitrogen from air using the MIL-101(Cr) prepared according to Preparation Example 2 as an adsorbent was identified. For nitrogen, oxygen and argon adsorption, a Monosorb gas adsorption device manufactured by Qunatachrome Instruments was used up to 1 atmosphere, and an IGA weight analyzer manufactured by Hiden Isochema Ltd. was used at a high pressure of 1 atmosphere or higher. Each adsorption condition of nitrogen, oxygen and argon gas changed up to 20 atmosphere at 20° C. or 25° C. As the adsorbent for gas adsorption, 100 mg of the MIL-101(Cr) powder was weighed and used for the Monosorb gas adsorption device, and 30 mg of the MIL-101(Cr) powder for the IGA weight analyzer. The adsorbent was cooled to 25° C. and used after carrying out pretreatment of heating for 6 hours at 250° C. Isotherms for nitrogen, oxygen and argon adsorption were obtained using the MIL-101(Cr) as the adsorbent, and shown in FIG. 7.

Figure 7:
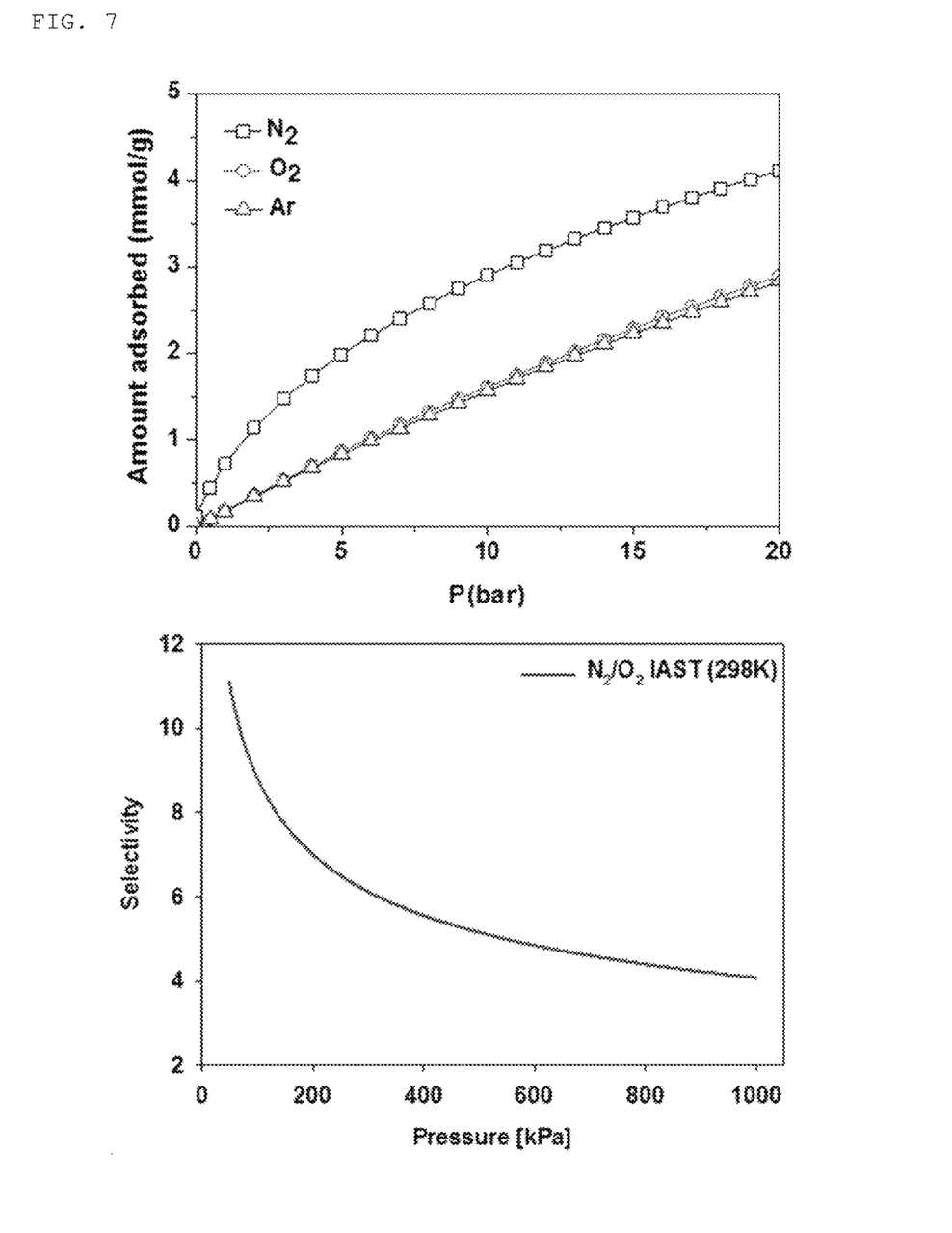
FIG. 7 is a diagram showing isotherms for nitrogen, oxygen and argon adsorption within a range of an adsorption temperature of 25° C. and an adsorption pressure of 20 atmosphere in an MIL-101(Cr) adsorbent, and nitrogen selectivity for oxygen up to 10 atmosphere for a gas mixture including 79% of nitrogen and 21% of oxygen applying an ideal adsorbed solution theory based on the above-mentioned adsorption isotherms.

As shown in FIG. 7, the MIL-101(Cr) adsorbent was identified to exhibit significantly high adsorptivity for nitrogen compared to oxygen or argon in the whole pressure range measured. This indicates that the MIL-101(Cr) adsorbent is useful in separating nitrogen from air, a gas mixture including approximately 79% of nitrogen, 21% of oxygen and less than 1% of argon. However, the MIL-101(Cr) exhibited similar adsorptivity for oxygen and argon, and therefore, it was identified that an additional process was required for separating these gases.

Based on the result shown above, selectivity of nitrogen for oxygen was calculated up to 10 atmosphere for a gas mixture including 79% of nitrogen and 21% of oxygen, which is similar to atmospheric air, using an ideal adsorption solution theory, and the result is shown in FIG. 7. As a result, it was identified that high nitrogen selectivity from minimum 4 to maximum 11 was exhibited. This indicates that nitrogen in air is capable of being efficiently separated under an atmospheric condition using the MIL-101(Cr).

Example 5: Separation of Nitrogen from Air Using CPO-27 (Co)

Separation of nitrogen from air using the CPO-27(Co) prepared according to Preparation Example 3 as an adsorbent was identified. For nitrogen, oxygen and argon adsorption, an IGA weight analyzer manufactured by Hiden Isochema Ltd. was used. Each adsorption condition of nitrogen, oxygen and argon gas changed up to 20 atmosphere at 20° C. or 25° C. As the adsorbent for gas adsorption, 30 mg of the CPO-27(Co) powder was weighed and used. The adsorbent was cooled to 25° C. and used after carrying out pretreatment of heating for 6 hours at 250° C. Isotherms for nitrogen, oxygen and argon adsorption were obtained using the CPO-27(Co) as the adsorbent, and shown in FIG. 8.

Figure 8:
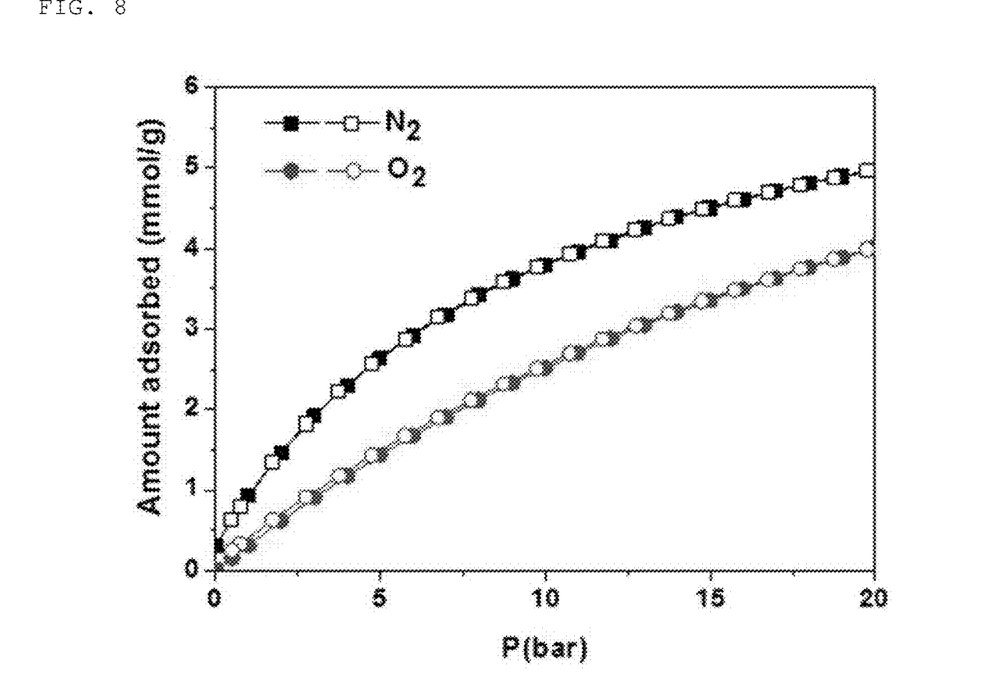
FIG. 8 is a diagram showing isotherms for nitrogen and oxygen adsorption within a range of an adsorption temperature of 25° C. and an adsorption pressure of 20 atmosphere in a CPO-27(Co) adsorbent.

As shown in FIG. 8, the CPO-27(Co) was identified to exhibit significantly high adsorptivity for nitrogen compared to oxygen or argon in the whole pressure range measured.

Example 6: Separation of Oxygen and Argon in Air Using MIL-100(Fe)

Adsorptivity of nitrogen, oxygen and argon in air was identified using the MIL-100(Fe) prepared according to Preparation Example 4. The test was carried out in the same manner as in Example 2 except that the MIL-100(Fe) was used instead of the MIL-100(Cr), and isotherms for nitrogen, oxygen and argon adsorption were each obtained within a range of an adsorption temperature of 10° C. and an adsorption pressure of 1 atmosphere. As a result, the MIL-100(Fe) adsorbent was identified to exhibit significantly low adsorptivity for argon compared to nitrogen or oxygen in the whole pressure range measured. Based on the adsorption isotherms, when selectivity of oxygen for argon up to 1 atmosphere for a gas mixture mimicked to have a composition of 21% oxygen and 0.5% argon similar to atmospheric air was calculated using an ideal adsorption solution theory, it was identified that the selectivity was exhibited to be from 1.8 to 2.5. This indicates that argon is capable of being efficiently separated from oxygen under an atmospheric condition using the MIL-100(Fe).

Example 7: Separation of Air Using MIL-100(Cr) or MIL-101(Cr), and MIL-100(Fe)

Figure 9:
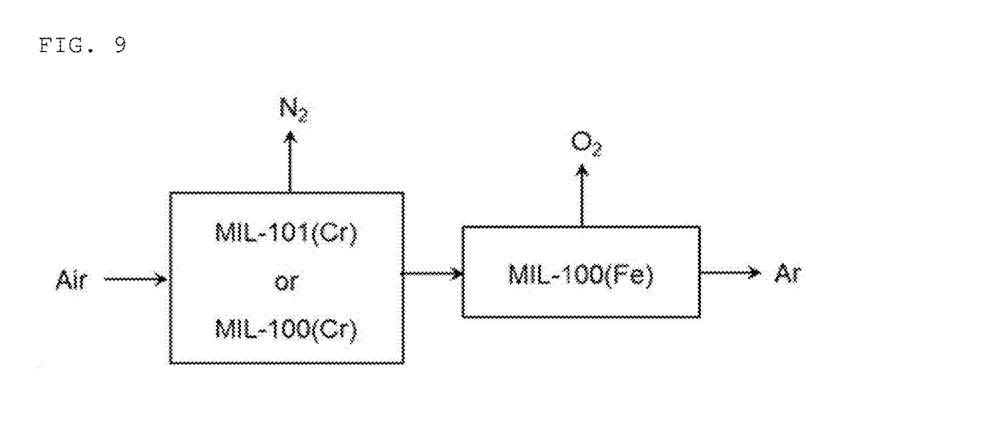
FIG. 9 is a diagram schematically showing a conceptual air separation device according to one embodiment of the present invention.

From Examples 2 and 3, it was identified that the MIL-100(Cr) and the MIL-101(Cr) exhibited similar adsorptivity for oxygen and argon while exhibiting significantly higher adsorptivity for nitrogen compared to oxygen and argon. In addition, from Example 5, it was identified that the MIL-100(Fe) exhibited similar adsorptivity for nitrogen and oxygen while exhibiting significantly higher adsorptivity for nitrogen and oxygen compared to argon. In other words, this indicates that, when passing a mixture of the 3 gases through the MIL-100(Cr) or the MIL-101(Cr), nitrogen is mostly adsorbed on the MIL-100(Cr) or the MIL-101(Cr), and a gas mixture of oxygen and argon without nitrogen is released. Herein, when passing the released gas mixture of oxygen and argon through the MIL-100(Fe), higher adsorptivity for oxygen compared to argon was exhibited, therefore, oxygen was adsorbed on the MIL-100(Fe), and argon gas is released. Accordingly, argon present in less than 1% in air was capable of being concentrated by continuously passing the gas that passed through the MIL-100(Cr) or the MIL-101 (Cr) through the MIL-100(Fe), and then collecting the released gas. Furthermore, the concentrated nitrogen and oxygen may also be obtained by collecting the gas collected from the MIL-100(Cr) or the MIL-101(Cr), and the MIL-100(Fe) each collecting nitrogen and oxygen. In other words, it was identified that, by consecutively using the MIL-100(Cr) or the MIL-101(Cr) having specific adsorptivity for nitrogen and the MIL-100(Fe) having high adsorptivity for nitrogen and oxygen, a device capable of efficiently separating nitrogen, oxygen and argon in air and concentrating each gas with high purity may be formed. A schematic constitution of the air separation device formed with a series of adsorbent columns is shown in FIG. 9. By using a pressure swing adsorption (PSA) method or vacuum swing adsorption (VSA) method for pressure differences before and after the adsorbent columns in the air separation device, air separation and high purity concentration of single component gas in air may be accomplished.

Example 8: Separation of Nitrogen/Methane Using Breakthrough Test of Molded MIL-100(Cr)

A breakthrough test device for adsorption separation provided with an adsorption column formed with a quartz tube having a ¼ inch outer diameter was filled with the molded MIL-100(Cr) adsorbent prepared according to Preparation Examples 1 and 6, and separation of nitrogen from a gas mixture of nitrogen and methane was identified. The molded MIL-100(Cr) was a sphere or elliptical sphere having a diameter of approximately 1 mm, and the adsorption column was filled with 0.75 g of the molded MIL-100 (Cr). Pretreatment of the adsorbent was carried out for 12 hours at 250° C. under a helium flow prior to carrying out the breakthrough test. As the gas used in the breakthrough test, two types of gas mixtures each mixing 20% of nitrogen and 80% of methane; and 10% of nitrogen and 90% of methane were used. The gas mixtures flowed into the adsorption column with a rate of 5 ml per minute at an atmospheric pressure using a flow controller. With the gas inflowed in the breakthrough test, changes in nitrogen and methane concentrations depending on the time indicated while passing the mixtures through the adsorption column using gas chromatograph equipped with a thermal conductivity detector (TCD) were analyzed at intervals of 30 seconds. As a result of the adsorption breakthrough test under such a condition, almost no gases were released as gas adsorption occurred on the adsorbent surface for the approximately first 3 minutes after the gas inflow, and methane gas started to be released through the adsorption column after approximately 3 minutes. Meanwhile, in the case of nitrogen, more amounts were adsorbed longer on the adsorbent surface, and nitrogen started to be released through the adsorption column after approximately 8 minutes in the gas mixture with 20% nitrogen content, and after approximately 9 minutes in the gas mixture with 10% nitrogen content. Adsorption selectivity of nitrogen with respect to methane on the adsorbent surface obtained from such an adsorption breakthrough test was analyzed to be approximately 3.2 in the gas mixture containing 20% of nitrogen and 80% of methane, and approximately 4.6 in the gas mixture containing 10% of nitrogen and 90% of methane. The nitrogen/methane adsorption separation result from the breakthrough test indicates that the adsorbent of the present invention is capable of being used in separating nitrogen and methane in a gas mixture, and furthermore, in separating and purifying various nitrogen-containing gas mixtures including separating nitrogen and oxygen in air, and is capable of being efficiently used in a PSA separation method and the like.

Example 9: Separation of Nitrogen and Hydrogen Using MIL-101 (Cr)

Selective separation of nitrogen from a gas mixture of nitrogen and hydrogen was identified using the MIL-101(Cr) prepared according to Preparation Example 2. An adsorption device and an adsorption condition for nitrogen and hydrogen adsorption were the same as in Example 3. When the adsorption amounts obtained at 20° C. and 1 atmosphere were compared, the nitrogen adsorption amount was 0.79 mmol/g and the hydrogen adsorption amount was 0.20 mmol/g or less, and this indicates that significantly high adsorptivity for nitrogen was exhibited compared to hydrogen. From such a result, it was identified that hydrogen gas was capable of being selectively separated by selectively adsorbing nitrogen from a gas mixture including hydrogen together with nitrogen.

Comparative Example 1: Synthesis of MIL-101(Cr) Including Coordinatively Unsaturated Site in Low Concentration and Separation of Nitrogen from Air Using the Same In order to identify the effect of porosity of the synthesized MIL-101(Cr) material and concentration of the coordinatively unsaturated metal site on a selective nitrogen adsorption property, a MIL-101(Cr) sample having significantly lower crystallinity and porosity compared to a purified material was prepared as comparison by controlling the synthesis method and condition. After increasing a molar ratio of F with respect to Cr from 0.25 to 0.75 in the synthesis solution composition from the synthesis condition disclosed in Preparation Example 2, the Teflon reactor containing a synthesis precursor solution was installed on an autoclave reactor, and a crystallization reaction was carried out for 8 hours at 220° C. in an electric heating oven. The product cooled to room temperature was consecutively washed with boiling water and ethanol, and then dried at 100° C., and as a result, a hybrid nanoporous material MIL-101(Cr) was obtained. The crystal XRD pattern of the final product was the same as the diffraction pattern of the sample obtained in Preparation Example 2, however, crystallinity was greatly reduced. After the finally obtained sample was pretreated for 6 hours under vacuum of approximately $1 \times 10^{-5}$ torr at 120° C., a physical adsorption isotherm of nitrogen at a low temperature of −196° C. was measured, and a BET specific surface area calculated therefrom was 3250 m$^2$/g, which was only 82% of the specific surface area for the sample obtained from Preparation Example 2. In addition, the concentration of the coordinatively unsaturated chrome site quantitatively obtained from measuring the synthesized sample by CO and NO chemical adsorption was exhibited to be less than 0.2 mmol/g, and this indicates that the concentration of the coordinatively unsaturated site significantly decreases due to the presence of unpurified impurities in the pores.

Separation of nitrogen from air using the MIL-101(Cr) material obtained as above as an adsorbent was identified. An adsorption property was analyzed using the adsorption device and method used in Example 1 except that the sample of this comparative example was used. Specifically, adsorption isotherms for nitrogen and oxygen were obtained by carrying out pretreatment of heating the sample obtained in this comparative example for 6 hours at 120° C., and cooling the result to 20° C. At the above-mentioned adsorption isotherms, the nitrogen adsorption amount at 20° C. and 1 atmosphere was 0.39 mmol/g, and the oxygen adsorption amount was 0.31 mmol/g, which was hardly effective in selective separation of nitrogen and oxygen. Moreover, the nitrogen adsorption amount was low of approximately ½ of the nitrogen adsorption amount for the high purity MIL-100 (Cr) obtained in Example 2. From such a result, it was identified that the presence of a coordinatively unsaturated site and a concentration perform an important role in selective nitrogen adsorption of a hybrid nanoporous material and adsorption separation of a nitrogen-containing gas mixture.

Comparative Example 2: Comparison with Zeolite 13X Adsorbent in Nitrogen Adsorption Separation from Air X-type Zeolite containing an alkali-based metal ion is an adsorbent having selective adsorptivity for nitrogen, and is a material currently used to separate nitrogen from air. In this comparative example, Zeolite 13X having a BET specific surface area of 805 m$^2$/g manufactured by UOP (Honeywell International Inc.) of the US was purchased, and cooled after being vacuum pretreated at 250° C. A nitrogen adsorption isotherm was measured up to 1 atmosphere at 20° C., and this was compared with the result for the MIL-100 (Cr) adsorbent and the MIL-101(Cr) adsorbent having selective adsorptivity for nitrogen according to the present invention. According to the nitrogen adsorption isotherm, the nitrogen adsorption amount of Zeolite 13X was 0.52 mmol/g at 1 atmosphere, which was lower than the MIL-101(Cr) and only ⅓ of the MIL-100(Cr), and it was identified that both the MIL-100(Cr) and the MIL-101(Cr) exhibited higher adsorptivity for nitrogen than Zeolite 13X.

In addition, nitrogen adsorption selectivity for oxygen up to 1 atmosphere for a gas mixture including 79% of nitrogen and 21% of oxygen, which is similar to atmospheric air, at 20° C. using the MIL-100(Cr) and Zeolite 13X was measured and calculated. As a result, it was identified that the MIL-100(Cr) had closer to twice the nitrogen selectivity for oxygen compared to Zeolite 13X at atmospheric pressure. This indicates that the MIL-100(Cr) adsorbent according to the present invention is capable of more efficiently separating nitrogen in air compared to Zeolite 13X used as an existing nitrogen adsorbent.

Comparative Example 3: Separation of Nitrogen and Oxygen Using Chromium-Based Hybrid Nanoporous Material MIL-53(Cr) Adsorbent Having No Coordinatively Unsaturated Site After synthesizing and obtaining a chromium-based hybrid nanoporous material MIL-53(Cr) adsorbent having no coordinatively unsaturated site using a method proposed in a reference literature (*J. Am. Chem. Soc.*, 124(45): 13519-13526 (2002)), its nitrogen selective adsorptivity was identified, and this was compared with the result for the MIL-100(Cr) and the MIL-101(Cr), hybrid nanoporous materials including a coordinatively unsaturated site exhibiting nitrogen selective adsorptivity of the present invention. The structure of the synthesized MIL-53(Cr) adsorbent was identified to be the same when compared using an X-ray diffraction spectrum reported in the literature, and a BET specific surface area deduced from a low temperature nitrogen physical adsorption isotherm was 1020 m²/g. According to the nitrogen adsorption isotherm, the nitrogen adsorption amount of the MIL-53(Cr) obtained at 20° C. and 1 atmosphere after vacuum pretreatment for 6 hours at 250° C. was 0.40 mmol/g, which was only approximately ⅓ of the MIL-100(Cr) and approximately ½ of the MIL-101(Cr), and it was identified that the MIL-100(Cr) and the MIL-101(Cr) exhibited significantly higher nitrogen adsorptivity than the MIL-53(Cr). In addition, the oxygen adsorption amount of the MIL-53(Cr) adsorbent was approximately 0.34 mmol/g at 1 atmosphere, and a difference in the adsorption amounts of nitrogen and oxygen was not large, and it was not effective at all in separating nitrogen and oxygen from the gas mixture. From such a result, it was identified that the presence of a coordinatively unsaturated site performs an important role in selective nitrogen adsorption of a hybrid nanoporous material and adsorption separation of a nitrogen-containing gas mixture.

An organic-inorganic hybrid nanoporous material according to the present invention having a coordinatively unsaturated metal site, particularly, a nitrogen selective adsorbent including a metal ion such as a trivalent chromium ion, a cobalt ion, a tungsten ion, a molybdenum ion, a ruthenium ion, a niobium ion, a manganese ion, a nickel ion, a copper ion, a zinc ion, a titanium ion or a zirconium ion as a central metal in a metal-organic framework exhibits excellent adsorptivity for nitrogen gas compared to methane, oxygen and argon. Accordingly, high concentration methane gas may be obtained by separating and removing nitrogen from nitrogen-containing natural gas, shale gas or the like using a nitrogen adsorbent including the organic-inorganic hybrid nanoporous material, and high purity nitrogen gas may be obtained depending on the purposes, and therefore, the adsorbent is useful in purifying these gases. In addition, air treated with the nitrogen adsorbent mostly includes oxygen and argon, and therefore, oxygen and argon may be separated by treating the gases again with an oxygen adsorbent, and by collecting the gas passing through all the adsorbents and the gas collected in each adsorbent, nitrogen, oxygen and argon in air are capable of being separated with high purity, and accordingly, an air separation device formed by combining the nitrogen adsorbent according to the present invention and the oxygen adsorbent is useful in preparing high purity gases. In addition, high purity gases obtained using the method described above may be used in preparing liquid methane, nitrogen, oxygen, argon and the like using a liquefied system depending on each purpose. The nitrogen adsorbent including the organic-inorganic hybrid nanoporous material may be used in selectively separating nitrogen from a gas mixture including nitrogen and at least one component of helium, neon, argon or hydrogen, which are inert gases.

What is claimed is:

1. A device for separating nitrogen from a gas mixture containing nitrogen and methane, the device comprising a hollow fiber or hollow fiber-formed nitrogen adsorbent separation membrane having nitrogen selective adsorptivity, wherein the membrane comprises an organic-inorganic hybrid nanoporous material that includes a coordinatively unsaturated metal site with density of 0.2 mmol/g to 10 mmol/g in a skeleton, surface, or pore.

2. The nitrogen separation device of claim 1, wherein the gas mixture containing nitrogen and methane is natural gas or shale gas.

3. A method for preparing natural gas or shale gas in which nitrogen is removed or nitrogen content decreases, the method comprising removing nitrogen from a gas mixture containing nitrogen and methane using a nitrogen adsorbent having nitrogen selective adsorptivity, wherein the nitrogen adsorbent comprises an organic-inorganic hybrid nanoporous material having a coordinatively unsaturated metal site with density of 0.2 mmol/g to 10 mmol/g in a skeleton, surface or pore.

4. A method for preparing high purity liquefied methane or high purity liquefied nitrogen comprising:
   separating nitrogen from a gas mixture containing nitrogen and methane using a nitrogen adsorbent having nitrogen selective adsorptivity, wherein the nitrogen adsorbent comprises an organic-inorganic hybrid nanoporous material having a coordinatively unsaturated metal site with density of 0.2 mmol/g to 10 mmol/g in a skeleton, surface or pore; and
   liquefying the separated methane or separated nitrogen.

5. A device for separating nitrogen, oxygen or argon provided with a nitrogen adsorbent having nitrogen selective adsorptivity, wherein the nitrogen adsorbent comprises an organic-inorganic hybrid nanoporous material having a coordinatively unsaturated metal site with density of 0.2 mmol/g to 10 mmol/g in a skeleton, surface or pore and an oxygen adsorbent.

6. The device for separating nitrogen, oxygen or argon of claim 5, wherein the nitrogen adsorbent and the oxygen adsorbent are arranged in consecutive order or in reverse order along the flow of a gas mixture.

7. A method for preparing high purity nitrogen, high purity oxygen or high purity argon all separated from a gas mixture containing nitrogen, oxygen or argon, the method comprising:

a first step of treating with a nitrogen adsorbent having nitrogen selective adsorptivity, wherein the nitrogen adsorbent comprises an organic-inorganic hybrid nanoporous material having a coordinatively unsaturated metal site with density of 0.2 mmol/g to 10 mmol/g in a skeleton, surface or pore; and a second step of treating with an oxygen adsorbent, wherein the first step and the second step are carried out either in consecutive order or in reverse order.

8. The preparation method of claim 7, further comprising liquefying the separated high purity nitrogen, the separated high purity oxygen or the separated high purity argon.

9. A method for preparing nitrogen or high purity inert gas all separated from a gas mixture containing nitrogen and inert gas, the method comprising selectively adsorbing nitrogen at an adsorption temperature of −20° C. to 80° C. using a nitrogen adsorbent having nitrogen selective adsorptivity, wherein the nitrogen adsorbent comprises an organic-inorganic hybrid nanoporous material having a coordinatively unsaturated metal site with density of 0.2 mmol/g to 10 mmol/g in a skeleton, surface or pore.

10. The method for preparing separated nitrogen or separated high purity inert gas of claim 9, wherein the inert gas is one or more selected from the group consisting of helium, neon, argon and hydrogen.

11. A method for preparing high purity argon separated from an argon-containing gas mixture including oxygen, nitrogen and mixtures thereof, the method comprising:
selectively adsorbing nitrogen and oxygen on an organic-inorganic hybrid nanoporous material MIL-100(Fe) containing iron as a central metal; and
collecting the permeated argon gas.

12. The nitrogen separation device of claim 1, wherein the coordinatively unsaturated metal site is formed by removing a part or all of water, a solvent molecule other than water or a ligand included in the organic-inorganic hybrid nanoporous material.

13. The nitrogen separation device of claim 1, wherein the device is a pressure swing or temperature swing adsorption separation device.

14. The nitrogen separation device of claim 1, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

15. The method of claim 3, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

16. The method of claim 4, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

17. The device of claim 5, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

18. The method of claim 7, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

19. The method of claim 9, wherein the organic-inorganic hybrid nanoporous material having the coordinatively unsaturated metal site includes one or more metal ions selected from the group consisting of a trivalent chromium ion, a cobalt ion, a tungsten ion, a molybdenum ion, a ruthenium ion, a niobium ion, a manganese ion, a copper ion, a zinc ion, a titanium ion and a zirconium ion as a metal.

* * * * *